United States Patent Office 2,776,329
Patented Jan. 1, 1957

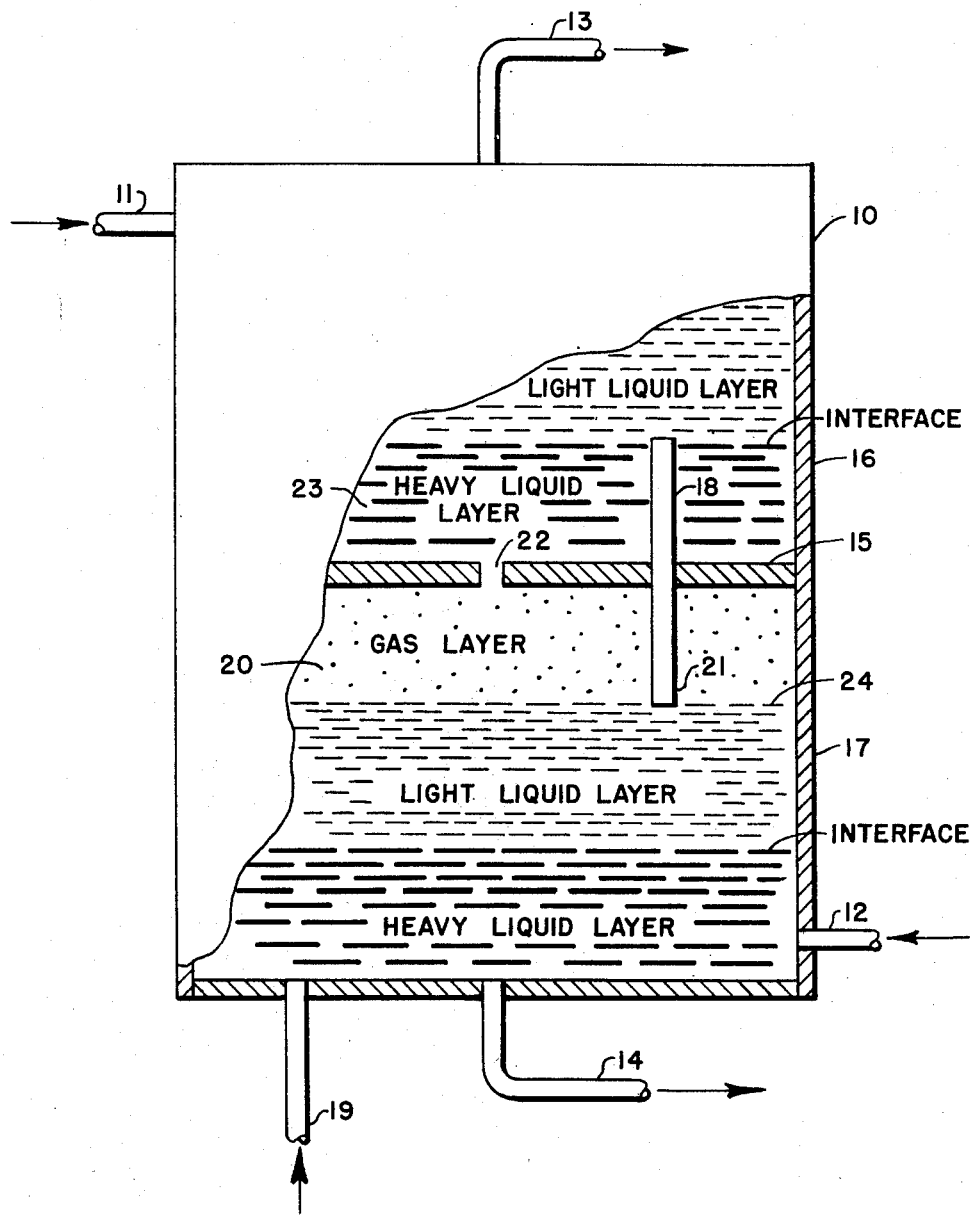

2,776,329

PROCESS AND APPARATUS FOR LIQUID-LIQUID EXTRACTION

Samuel J. Mayeux, Jr., Baton Rouge, La., assignor to Esso Research and Engineering Company, a corporation of Delaware Application September 15, 1954, Serial No. 456,097

3 Claims. (Cl. 260—677)

This invention relates to a method of treating liquids by contacting them with other liquids, the reagent liquid being to a great degree immiscible or only partly miscible with the treated liquid and differing therefrom in specific gravity to a degree sufficient to permit separation of the two liquids by gravity, as well as to apparatus in which such a process may be carried out.

Operations of this general type occur very widely in chemical processes. They are very frequently used in the refining of oils, as, for instance, in contacting petroleum distillates with selective solvents, with sulfuric acid, or with alkaline solutions, in the solvent extraction of hydrocarbon mixtures, including naphthas and lubricating oils, products from coal carbonization, synthetic fuels and lubricants, and the separation of chemical mixtures by virtue of differences in solubility of the components of the mixtures.

In the past it has been well known to carry out liquid-liquid extraction processes by providing a vertical tower having a series of vertically spaced perforated plates containing risers projecting above the upper surface of these plates. The heavier of the two liquids to be contacted would be introduced into the top of such an extraction tower, while the lighter liquid would be introduced at the bottom. The heavier liquid would move downwardly through the tower, passing through the perforations in each plate, mixing with the lighter liquid in the space formed between the plates, and settling into discrete layers within such zones. In order to encourage intimate contact between the two liquids in these settling zones, a number of expedients have been proposed. Among such expedients have been the use of aspirators to suck liquid from one layer to another and to propel it into a layer of the other liquid, thus effecting good mixing. Such apparatus involves the use of moving parts, and, in some cases, timing mechanisms for operating the aspirators, which are relatively expensive and which may be subject to wear and corrosion by the liquids employed.

It is a principal object of the present invention, therefore, to provide a method and apparatus for contacting two immiscible liquids of different specific gravities in which such contacting is carried out efficiently and without the use of equipment having moving parts subject to wear and corrosion.

It is a further object of the invention to provide apparatus for carrying out efficient liquid-liquid contacting.

It is a further object of the present invention to provide a process for the efficient contacting of two liquids of different specific gravities in which one of the liquids contacts the other at high velocity in the form of a liquid jet.

These objects, as well as others which will be in part apparent and in part subsequently pointed out, are accomplished by providing a process for contacting two immiscible liquids of different specific gravities in a vertical tower having vertically spaced perforated plates and in which the plates are adapted to trap a layer of gas adjacent the lower surface thereof. A gas which is inert with respect to the liquids involved and which is insoluble in them is injected into the bottom of the extraction tower and forms a layer adjacent the lower surface of the perforated plate. The heavier liquid, which is descending through the tower, moves through the perforations in the plate and jets across the gas layer, thus contacting the lighter liquid at high velocity and promoting good mixing, thereby increasing the efficiency of the process involved, as, for example, solvent extraction. A preferred means of forming such gas layers is to provide the perforated plates with risers extending both below and above the surface thereof so that the gas forms a shallow layer in order to obtain access to the riser and pass upwardly through it.

In processes involving the use of easily vaporizable materials such as light hydrocarbons, the injection of gas from an outside source may be unnecessary since conditions of pressure and temperature may be so adjusted that sufficient hydrocarbon will be present in the form of vapor to insure the formation of adequate gaseous layers.

A more complete understanding of the invention may be had by reference to the accompanying single figure of drawings, which shows diagrammatically a liquid-liquid extraction system employing the method and apparatus of the present invention. A portion of the extraction tower is broken away to show a typical perforated plate and the stratification of liquids which occurs therein.

The extraction tower 10 is provided with a line 11 for introducing relatively heavy liquid into the top thereof and a line 12 for introducing relatively light liquid into the bottom. Treated light liquid is withdrawn from the top of the tower through line 13, while the treated heavy liquid is withdrawn from the bottom of the tower through line 14. The tower 10 is provided with a plurality of vertically spaced perforated plates, one of which is shown in cross-section and indicated generally at 15. Between each of the plates there occur settling zones, typical of which are zones 16 and 17. The plate 15 is provided with a riser 18, which extends through the plate into the upper settling zone 16 and downwardly below the surface of the plate 15 into the lower settling zone 17. As is shown, the liquids in each of the separate zones separate into an upper light liquid layer and a lower heavy liquid layer.

In operating the process of the present invention, a small amount of an inert gas, which is typically nitrogen, may be introduced into the bottom of the tower 10 through line 19. Because the riser 18 extends below the surface of the plate 15, the gas forms a layer indicated at 20 adjacent the lower surface of the plate 15 in order to gain access to the lower end 21 of the riser 18. The perforations in the plate 15, one of which is shown and indicated at 22, are of such a size that the rising gas cannot pass through them against the pressure of the heavy liquid layer and must seek to rise through the relatively large diameter riser such as 18. The heavy liquid layer indicated at 23 in passing downwardly through the column passes through the perforation 22 and jets across the gas layer 20 contacting the vapor-liquid interface 24 at high velocity, thus causing improved mixing between the heavy liquid and the light liquid. Upon settling, the heavy liquid displaces light liquid which is forced upwardly through the riser 18 and ejected into the section of the tower immediately above. In this way the light liquid works its way to the top of the tower.

It will be understood, of course, that while only one perforation is shown in the plate 15, it is customary that there be a plurality of these, often as many as seventy or eighty in a tower having a diameter up to about two feet.

As an example of the improved efficiencies obtained by the use of the process of the present invention as contrasted with the use of conventional perforated plates, a mixture of liquid butenes and butadiene as a continuous phase was contacted with a cuprous ammonium acetate solution as a dispersed or heavy phase in an extraction tower having a diameter of eighteen inches. The tower contained five plates spaced 2½ feet apart in a vertical direction. Each plate contained sixty-one 3/16-inch diameter perforations, and one riser which extended 24 inches above and 2 inches below the surface of the plate and which had a diameter of 3 inches. Using different rates of introducing the copper solution, the following results were obtained as set forth in Table I below:

*Table I*

| Copper Solution Rate in Gallons of Solution Per Hour Per Perforation | Plate Efficiency in Percent | |
| --- | --- | --- |
| | Conventional Perforated Plates | Plates Using Extended Risers With Introduction of Nitrogen |
| 16 | 20 | 24 |
| 18 | 19.5 | 23.7 |
| 20 | 17.5 | 22 |

While one specific embodiment of the present invention has been illustrated using particular solutions, it will be understood, of course, that the process and apparatus of the present invention is equally applicable to any liquid-liquid contacting system wherein the two liquids are substantially immiscible and in which their specific gravities are sufficiently different to permit of separation by settling. It will be further understood that the nature of the inert gas employed will vary according to the composition of the liquids involved and that any gas may be employed, provided that it is inert to the liquids involved and substantially insoluble in them under the temperature and pressure conditions of the process. The invention also expressly includes providing the gas by vaporizing one of the liquid constituents of the process.

What is claimed is:

1. A process for contacting two immiscible liquids of different specific gravities in a unitary extraction zone having a plurality of vertically spaced separation stages separated from each other by horizontal, finely perforated partitions, which process comprises introducing a relatively heavy liquid into the top portion of said extraction zone, introducing a relatively light liquid into the bottom portion of said extraction zone, introducing an inert gas into the several separation stages of said extraction zone, trapping said gas in the form of stagnant layers between adjacent separation stages, maintaining a heavy liquid layer in the lower portion of the several separation stages, and thereby preventing said gas from rising from one separation stage to the next higher one against the pressure of the liquid, maintaining a light liquid layer above said heavy liquid layer and beneath the gas layer separating one separation stage from the next higher separation stage, jetting said relatively heavy liquid in the form of fine-diameter streams from one separation stage downwardly across and in direct contact with said stagnant gas layer into said light liquid in the next lower separation stage, passing the relatively light liquid as a confined stream from one light liquid layer upwardly across and in indirect contact with the superadjacent stagnant gas layer to the next higher separation stage, said confined stream having a diameter that is relatively large with respect to each of the aforesaid fine-diameter streams, withdrawing relatively light liquid from an upper portion of the extraction zone, and withdrawing relatively heavy liquid from a lower portion of the extraction zone.

2. Process according to claim 1 wherein said relatively heavy liquid comprises an aqueous solution of cuprous ammonium acetate and said relatively light liquid comprises liquid butene.

3. Process according to claim 2 wherein said inert gas is nitrogen.

References Cited in the file of this patent

UNITED STATES PATENTS

| | | |
| --- | --- | --- |
| 1,951,787 | Child et al. | Mar. 20, 1934 |
| 2,429,134 | Morrell | Oct. 14, 1947 |
| 2,520,391 | Findlay | Aug. 29, 1950 |